May 5, 1970 R. H. BAKER 3,510,689

BISTABLE FLIP-FLOP CIRCUIT WITH MEMORY

Filed Nov. 1, 1966 2 Sheets-Sheet 2

INVENTOR
RICHARD H. BAKER
BY [signature]
ATTORNEY

BISTABLE FLIP-FLOP CIRCUIT WITH MEMORY

Filed Nov. 1, 1966 2 Sheets-Sheet 1

INVENTOR
RICHARD H. BAKER
BY [signature]
ATTORNEY.

United States Patent Office 3,510,689 Patented May 5, 1970

3,510,689

BISTABLE FLIP-FLOP CIRCUIT WITH MEMORY

Richard H. Baker, Bedford, Mass., assignor to Massachusetts Institute of Technology, Cambridge, Mass., a corporation of Massachusetts Filed Nov. 1, 1966, Ser. No. 591,231
Int. Cl. H03k *17/00, 3/15*
U.S. Cl. 307—238 4 Claims

ABSTRACT OF THE DISCLOSURE

A bistable circuit is energized from a pulsed D.C. energy source of low duty cycle. The bistable circuit is triggered to assume one of two states while the energy is applied. A capacitor is connected to the bistable circuit and assumes a voltage dependent upon the state of the bistable circuit. A switch electrically disconnects said capacitor from the bistable circuit during the time the energy is not applied. When the energy is applied, the bistable circuit assumes the state corresponding to the voltage stored on the capacitor.

This invention relates to the method and apparatus for operating standard switching circuits in a pulsed power circuit mode and in particular to the operation of bistable circuits with a gated power supply together with gated signal storage.

Electronic circuits which use a minimum of energy from the power source find application where the heat dissipation capability of the components may be a limiting factor or where, as in space applications, there is limited power available from the energy source. Improved semiconductor components, which allow the use of higher circuit impedance levels primarily because of their lower leakage currents and high current gain coupled with high frequency response, have been utilized in some applications to reduce source power. In addition, circuit innovations leading to more efficient conversion of the D.C. energy of the source into signal energy have been developed. Such a circuit is described in applicant's Pat. 3,010,031.

Inasmuch as switching system complexity, speed, power drain, and stability are all inter-related, there exists a natural upper bound based primarily on component parameters and system environment on the value of impedance levels that may be employed. Present low-power drain switching circuit technology restricts this impedance level to the range of 0.1 to 10 megohms with an accompanying 3 to 12 volt supply which gives an average power drain in the order of 2 to 2000 microwatts per bistable element capable of operating in the few thousand bits per second speed range.

The present invention provides a switching circuit which has an average circuit power consumption comparable to that of conventional low-power circuits while allowing at the same time increased design freedom through a relaxation of many of the traditional low-power design requirements such has premium semiconductor component performance, i.e., low leakage and high current gain at low current; low stray capacitance; high circuit impedance, which is presently difficult to obtain within the integrated technology; and low tolerance passive components. In addition, this invention offers increased stability with regard to high temperature operation, radiation damage, and spontaneous triggering due to induced transient phenomena.

It is therefore a primary object of this invention to provide bistable electronic switching circuitry which has the above enumerated desirable characteristics.

It is a further object of this invention to provide a reduction of circuit complexity with a resulting increase in system reliability through the "multi-use" or time sharing capability of the invention.

It is a feature of this invention that for bistable circuit applications requiring moderate repetition rate capability and low average power drain, the circuit may be designed to use high power when energized thereby avoiding high impedance levels which require premium quality components.

It is a further feature of this invention that the lower impedance levels of the bistable circuits used in the invention make it less subject to environmental factors such as noise pickup, radiation and temperature variation.

It is a further feature of this invention that isolation of the circuit from the power supply by filtering becomes much easier because of the pulsed power operation where a simple resistor-capacitor filter combination can be used. The resistor also isolates the circuit from the remaining circuitry and thus replaces the need for a fuse, a notably unpredictable component.

It is another feature of this invention that the pulse powered circuit of this invention can be applied to any bistable circuit such as two- or four-transistor bistable circuits, or metal oxide semiconductor transistor circuits, so long as the state of the circuit can be reestablished from a stored voltage.

These objects and features are achieved in this invention by operating a conventional bistable switching circuit in conjunction with a pulsed source of power which reduces the average power consumption of the circuit. The state of the switching circuit is preserved during the time the power is not applied to the circuit by storing the state information in a capacitor which is subsequently switched into the circuit to reestablish its state when power is applied.

Other objects and features of the invention will become apparent from the following description and claims as illustrated in the accompanying drawings, in which:

Figure 1:
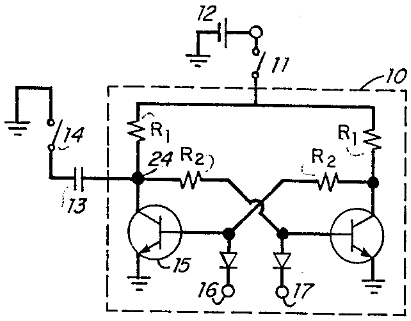
FIG. 1 is an idealized configuration of a pulse powered bistable circuit in accordance with the invention.

An embodiment of a pulsed power circuit with idealized switches 11, 14 is shown in FIG. 1. A conventional two-transistor bistable circuit 10 is connected through switch 11 to a power source 12. A capacitor 13 is connected to the collector 24 of one of the transistors and to ground through switch 14. Switches 11 and 14 are caused to open and close concurrently. When switch 14 is closed capacitor 13 has a voltage which is the same as that of collector 24 and therefore is either at a potential which is close to the supply voltage of source 12 when transistor 15 is in the "off" condition or is near ground potential when transistor 15 is in the "on" or conducting condition. If switch 14 is opened, the voltage across capacitor 13 will retain the state of transistor 15 for a considerable period of time dependent upon the rate at which charge leaks off the capacitor 13 through switch 14. If switch 14 is closed before the voltage on capacitor 13 has changed too greatly, because of charge leakage, the bistable flip-flop circuit 10 will assume the same state that it had at the time switch 14 was opened. Thus the bistable circuit of FIG. 1 can be operated with the power only intermittently applied through switch 11 instead of the continuous application of power as in conventional operation.

If the switches 11, 14 are closed for a short time duration $w$ seconds at some repetition period $\tau$ seconds, the power drain from the energy source 12 is reduced by the factor $w/\tau$ for the condition where the bistable circuit 10 is not changing its state. The power must be applied for a time sufficient to allow the bistable circuit 10 together with any accompanying networks which may be driven by the bistable network to be reestablished to its former state by capacitor 13, at which time a trigger pulse may be applied to the set, reset terminals 16, 17 of the circuit 10 to change the state of the circuit if such is desired. The manner of triggering the network 10 though terminals 16, 17 is well known to those skilled in the art. The power must continue to be applied to the circuit after the trigger has occurred for a time sufficient to allow circuit 10 to change its state. Normally, about three time constants of time are required to reestablish the state of the circuit 10 and a similar time to determine a change of state.

Figure 2:
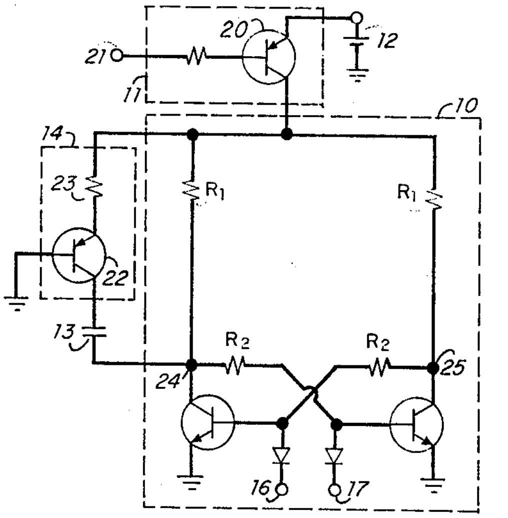
FIG. 2 is a practical realization of the pulse powered bistable circuit.

A practical realization of the idealized bistable pulsed powered circuit of FIG. 1 is shown in FIG. 2. The transistor 20 acts as the switch 11 for providing power to the bistable circuit 10. The transistor 20 is turned "on" by applying a negative pulse to its base terminal 21. The base is normally at a potential such that the transistor 20 is normally not conducting.

Switch 14, which comprises the transistor 22 and the resistor 23 of FIG. 2 is automatically closed when power is applied to it through transistor 21 when in the "on" condition. Similarly, transistor 22 is automatically caused to become an open circuit when transistor 20 ceases to conduct. The charge which exists across capacitor 13 has a polarity such that it will leak off capacitor 13 through the high resistance of the back biased collector diode of transistor 22. During the time interval during which transistor 20 is in the "off" condition, capacitor 13 will be discharging toward ground potential if it stored a positive voltage at terminal 24 at the time that switch 11 was turned off. The rate at which capacitor 13 loses its stored charge is determined primarily by the leakage in the "off" condition of switch 14. The rate at which the capacitor 13 loses its stored charge determines the maximum allowable time duration before reestablishing the voltage of capacitor 13. It is necessary to apply a power pulse to bistable circuit 10 while the voltage remaining on capacitor 13 is sufficient to cause circuit 10 to assume the same state as existed at the termination of the preceding power pulse. If this is the case, the charge which capacitor 13 lost during the preceding "off" period of circuit 10 will be reestablished on capacitor 13. Thus, the power pulse can be turned on and off indefinitely without losing the initial state of circuit 10.

The circuit of FIG. 2 is such that the charge stored on capacitor 13 determines and then assumes the state of the bistable circuit 10 each time that the power switch 11 is energized because switch 14 is automatically closed. However, if instead of the switch circuit 14 of FIG. 2, a different type of switch circuit is used which does not turn on and off automatically when the power gate 11 is energized or deenergized, the bistable circuit 10 may be operated at a different repetition rate from that at which the capacitor 13 is switched in and out of the bistable circuit.

Figure 3:
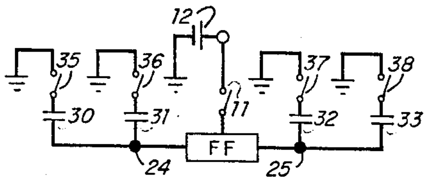
FIG. 3 is a "multi-use" or time-shared embodiment of a pulse powered bistable circuit.

It is feasible to control the action of switch 14 independent of the power switch 11. In fact, if the power switch is closed on a continuous basis, the circuitry functions as an ordinary two-transistor flip-flop, and the closing of switch 14 serves as a "sampler" storing the state of the flip-flop 10 at the sample time. This concept can be extended as shown in FIG. 3 to the case where a single flip-flop 10 is connected to a source of power 12 through switch 11 at a repetition rate depicted in waveform 11' of FIG. 4. The flip-flop 10 is shown in FIG. 3 to have connected to its collectors 24, 25 four capacitors 30, 31, 32, 33. These capacitors are connected to ground through their individual switches 35, 36, 37, 38, Capacitors 30, 31 are connected to collector 24, and capacitors 32, 33 are connected to collector 25. This connection is preferred since it equalizes the capacitances connected to the collectors 24, 25 of the flip-flop 10. If desired, all four capacitors could be connected to either collector 24, or 25.

Figure 4:
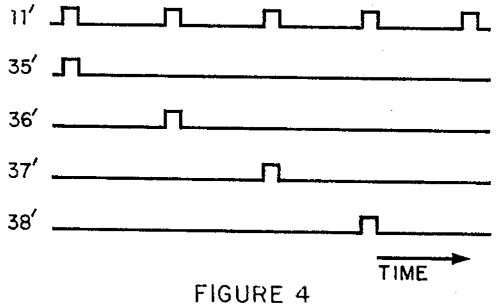
FIG. 4 represents a possible timing sequence for operation of the switches of the circuit of FIG. 3.

As seen in the waveform 11' of FIG. 4, switch 11, which applies power to the flip-flop 10, is closed four times as frequently as are the individual switches 35 though 38, which are closed in time sequence and in time coincidence with one of the times at which switch 11 is closed. It is thus seen that the bistable circuit 10 may be used in a multi-use or time-shared mode of operation since independent information may be stored on the capacitors 30 through 33. Of course, standard gating techniques would be employed to provide selected trigger pulses to the set, reset terminals 16, 17 of the bistable circuit 10 when a particular switch 35 through 38 is turned "on."

Figure 5:
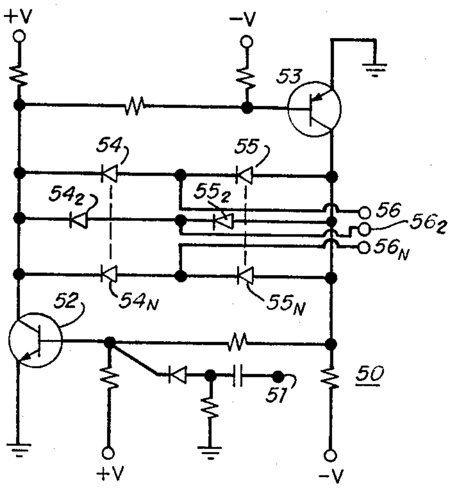
FIG. 5 is a pulsed diode switch circuit.

As mentioned earlier, with multi-use operation of the bistable circuit 10 of FIG. 3, it is necessary to have switches 35 through 38 independent of power switch 11 in order that a particular capacitor 30 through 33 can be selected for closure when switch 11 is closed. A suitable switch for this purpose is the triggered diode switch 50 shown in FIG. 5. The switch is closed by the application of a positive pulse such as pulse 35' of FIG. 4 to the input terminal 51. This pulse causes transistors 52, 53 to be conducting, thereby causing diodes 54, 55 to also become conducting to provide a low impedance at terminal 56 to virtual ground potential.

In the absence of pulse 35', diodes 54, 55 are back-biased and present a high impedance to the leakage of charge from capacitor 30. Other forms of triggered switches responsive to the waveform 35' may be used instead of the circuit of FIG. 5, in order to provide the selective connection of the capacitor 30 to the bistable circuit. One particularly attractive switch is the metal oxide semi-conductor transistor which exhibits very high leakage resistance when no pulse is applied to its base and a very low impedance when a pulse is present. The remaining capacitors 36 through 38 of FIG. 3 are connected in a similar manner to a separate switching circuit 50 such as that of FIG. 5 to selectively connect them to the bistable circuit 10 in response to pulses 35' through 38', respectively.

Figure 6:
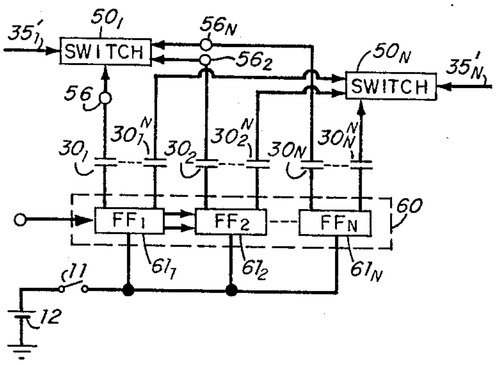
FIG. 6 is a shift register operated in the pulse powered mode.

Another example of the multi-use feature of this invention is shown in FIG. 6. A shift register 60 consisting of N flip-flop stages 61 is connected to power source 12 through switch 11. Clock pulses applied to the register input terminal 62 cause the register to shift in the usual manner. The clock pulses occur concurrently with power pulses 11'. The state of each flip-flop 61 of the register is determined by selectively turning on one of the switches 50 by a pulse 35'. If it is assumed that switch $\mathbf{50_1}$ is closed by the pulse $\mathbf{35'_1}$, the voltage which was stored on capacitors $\mathbf{30_1}$ through $\mathbf{30_N}$ will be transferred to their respective flip-flops $\mathbf{61_1}$ through $\mathbf{61_N}$. The switch $\mathbf{50_1}$ may be pulsed "on" by any desired number of pulses 35' during which the clock pulses on terminal 62 increase the count on the register 60. At the end of some predetermined number of pulses 35', the count then existing in the register 60 will be retained on capacitors $\mathbf{30_1}$ through $30_N$. The other switches $50_2$ through $50_N$ are similarly turned "on" when energized by pulses $35'_2$ through $35'_N$, respectively.

Where the switch 50 is used as in FIG. 6 to connect and disconnect a plurality of capacitors $30_1$ through $30_N$, the switch 50 will be constructed as previously described with the exception of having additional isolating diodes $54_2$ through $54_N$ and $55_2$ through $55_N$ connected to capacitors $30_2$ through $30_N$ respectively.

Figure 7:
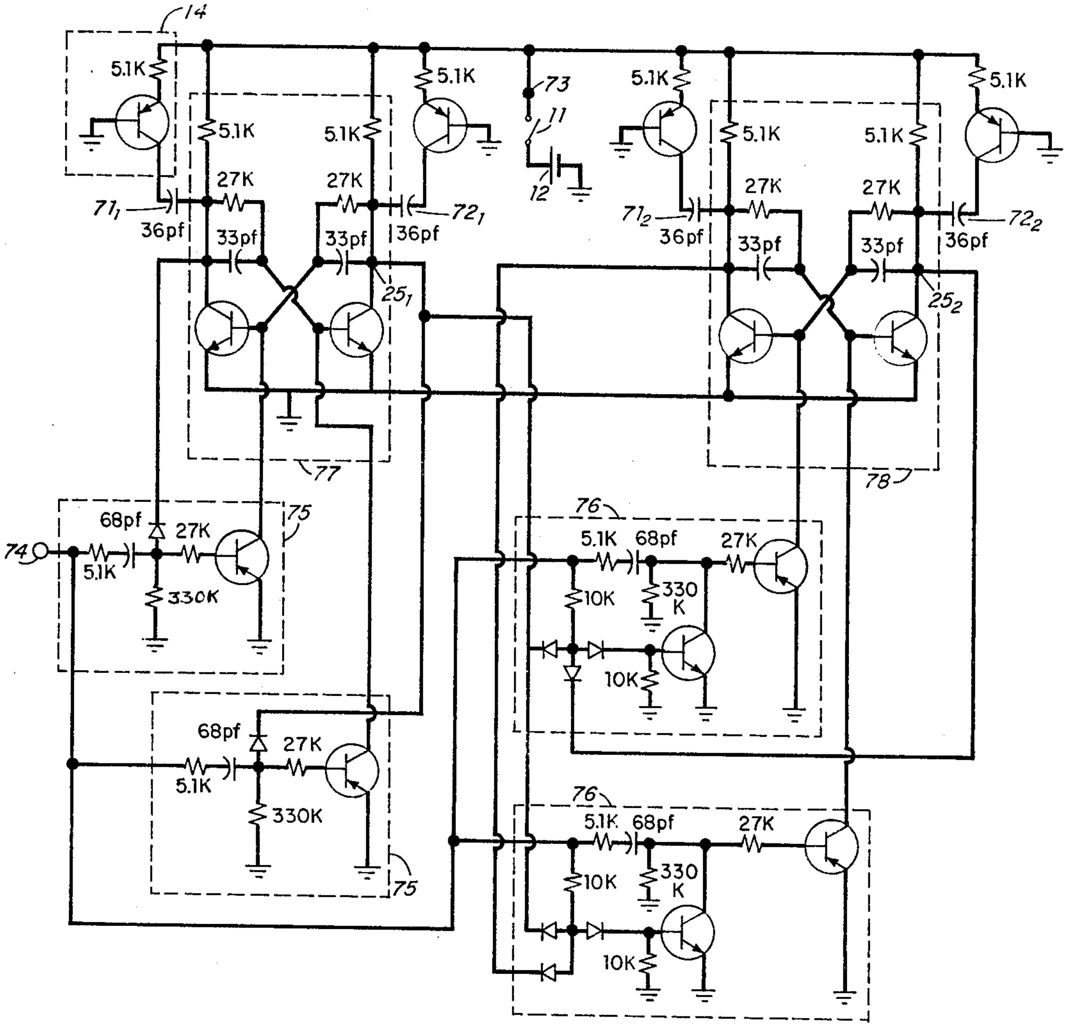
FIG. 7 is a two-stage counter operated in the pulse powered mode.

The two-stage counter of FIG. 7 was evaluated experimentally. Two storage capacitors 71, 72 were used on each stage only to obtain a more conservative power comparison between the operation of the circuit with the supply voltage continuously applied and operation with a pulsed power source. The system was designed to work at a one kilocycle repetition rate with an estimated total average leakage current of 0.1 microamp. The supply voltage in the pulse mode of operation was 2.5 microseconds in duration triggered on by the leading edge of the clock pulse of 4.6 volts magnitude applied to terminal 73. The clock pulse was a one microsecond pulse applied to terminal 74. The trigger circuits 75, 76 were designed to provide gated trigger pulses to the bases of the transistors of flip-flops 77, 78 at the trailing edge of the clock pulse. As stated previously, trailing edge logic is a natural consequence of pulse powered circuit operation where the leading edge of the clock pulse is used to turn on the power supply. During the clock pulse interval the switches 14 allow the stored charge on capacitors 71, 72 to force the flip-flops 77, 78 to assume the proper state. After the clock pulse interval has terminated, the remaining 1.5 microseconds during which the power supply is connected to terminal 73 allows the flip-flop states to respond to trigger pulses from trigger circuits 75, 76 at the terminal of the power pulse. The trigger circuits 75, 76 are conventional gating circuits arranged to provide a negative output pulse at the trailing edge of the clock pulse only when certain input conditions to the circuits exist. In FIG. 7 the gated trigger circuits 75, 76 are arranged to cause the flip-flops 77, 78 to perform as a two-stage counter circuit.

Figure 8:
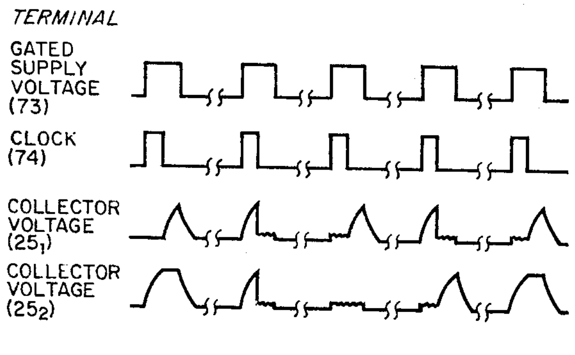
FIG. 8 shows the waveforms at various portions of the counter of FIG. 7.

An examination of the waveforms of FIG. 8 shows the relationship in timing between the clock, the gater-supply voltage, and the terminal 25 voltage on the first and second flip-flops 77, 78.

The counter of FIG. 7 will operate at much lower clock rates than the 1 kilocycle design rate because of lower actual leakage than assumed in the design. Counting at rates less than 7 pulses per second was observed which for the gated supply voltage pulse width of 2.5 microseconds resulted in a duty cycle of only $18\times10^{-6}$.

Figure 9:
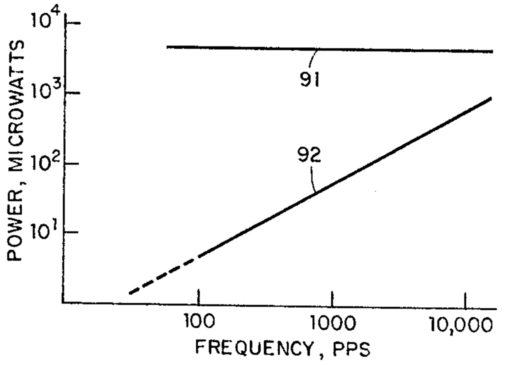
FIG. 9 shows the power consumption of the circuit of FIG. 7 for the pulsed power mode and the continuous power mode.

A comparison of the power requirements of the counter of FIG. 7 operated conventionally without the storage capacitors 71, 72, and also in the duty cycle mode, is shown in FIG. 9. Curve 91 shows power consumption for conventional operation, whereas curve 92 shows orders of magnitude of power reduction achieved through pulsed powered circuit operation including the power consumed by the gating circuits of FIG. 7. At the design frequency an improvement of two orders of magnitude is observed. The circuit performance is comparable to that obtained from state of the art complementary four-transistor flip-flop circuits.

Pulse powered circuit operating power can be reduced to two-thirds that shown in FIG. 9 by utilizing only one storage capacitor, either capacitor 71 or 72 per flip-flop stage. Experimental verification of single capacitor operation has been obtained.

The semi-conductor components used in FIG. 7 were epoxy packaged 2N3639 and 2N3646 transistors and 1N903 diodes, which are low performance units. Satisfactory operation was observed from 0° to +55° C. It should be noted that the system of FIG. 7 is not intended to be an optimum design but merely a straight-forward experimental verification of the state retention capabilities of gated capacitors, the gating logic, and the general feasibility of the invention for the reduction of supply power. The performance obtained is with non-critical components and the circuit parameters are realizable in integrated form.

Although the invention is illustrated with a two-transistor bistable circuit, it should be understood that other bistable circuits such as the four-transistor bistable circuit such as described in applicant's Pat. No. 3,010,031 may also be used. The principles of the invention can be applied to any circuit whose state when energized can be established by connecting to it a stored voltage.

While there have been shown and described the fundamental novel features of the invention as applied to preferred embodiments, it will be understood that various omissions, substitutions, and changes in the forms and details of the devices illustrated and in its operation may be made by those skilled in the art without departing from the spirit of the invention.

What is claimed is:

1. A pulse powered circuit comprising a bistable circuit,
- means for providing pulsed power for a time at least of the order of the switching time of said circuit to energize said bistable circuit,
- means for storing the state of said bistable circuit during the time said circuit is deenergized,
- said storing means also restoring the state of said bistable circuit when reenergized to the state which existed when said circuit was deenergized,
- means for changing the state of said bistable circuit during the time said bistable circuit is energized,
- said change of state occurring after said bistable circuit has had its former state reestablished by said restoring means,
- said pulsed power being applied for a time sufficient after said change of state to allow said storing means to respond to the changed state,
- said means for storing and restoring the state of said bistable circuit comprises a capacitor,
- a semiconductor switch,
- means for causing said switch to become electrically conductive when said bistable circuit is energized and electrically non-conductive when said bistable circuit is deenergized,
- said capacitor being serially connected between said switch and a terminal of said circuit having a potential which changes according to the state of said circuit,
- the potential of said capacitor during the time said circuit is deenergized being substantially the same as the potential just prior to deenergization of said circuit.

2. The apparatus as in claim 1 wherein:
- said means for causing said switch to become electrically conductive when said bistable circuit is energized and electrically non-conductive when said bistable circuit is energized comprises,
- said semiconductor switch comprising a transistor having a base, collector and emitter, said base being connected to ground, said collector being connected to said capacitor and said emitter being connected to said pulsed power means,
- said semiconductor switch being responsive to said pulsed power to provide a low impedance to the flow of current through said capacitor and a high impedance in the absence of said pulsed power.

3. The apparatus as in claim 1 wherein:
- said means for causing said switch to become electrically conductive when said bistable circuit is energized comprises a source of pulses coincident in time with said power pulses,
- said semiconductor switch being responsive to said pulses to provide a low impedance during said pulses and a high impedance in the absence of said pulses.

4. A pulse powered circuit comprising a bistable circuit, means for providing pulsed power for a time at least of the order of the switching time of said circuit to energize said bistable circuit, means for storing the state of said bistable circuit during the time said circuit is deenergized, said storing means also restoring the state of said bistable circuit when reenergized to the state which existed when said circuit was deenergized, means for changing the state of said bistable circuit during the time said bistable circuit is energized, said change of state occurring after said bistable circuit has had its former state reestablished by said restoring means, said pulsed power being applied for a time sufficient after said change of state to allow said storing means to respond to the changed state, said means for storing and restoring the state of said bistable circuit comprises, a plurality of serially connected capacitors and semiconductor switches, each connected to said bistable circuit, means for providing a switch pulse coincident in time with said power pulses to a selected switch to cause said switch to become electrically conductive to connect its associated capacitor to said bistable circuit, said connection causing said bistable circuit to assume the state corresponding to the voltage across said capacitor at the time said selected switch becomes conducting, means for changing the state of said bistable circuit subsequent to its state being established by said connected capacitor, said switch pulse terminating subsequent to said changed state to cause said selected switch to become electrically non-conductive, whereby the capacitor voltage corresponding to the state of the bistable circuit at the time the switch pulse is terminated is stored in said capacitor until its serially connected switch again becomes electrically conductive.

References Cited

UNITED STATES PATENTS

| | | | |
|---|---|---|---|
| 2,982,870 | 5/1961 | Hilbeber | 307—292 X |
| 3,178,592 | 4/1965 | Fischer et al. | 307—247 X |
| 3,373,295 | 3/1968 | Lambert | 307—238 |

OTHER REFERENCES

Clapper, G. L., Gated Comparison Circuit, IBM Technical Disclosure Bulletin, vol. 6, No. 9, February 1964, pp. 69, 70.

JOHN S. HEYMAN, Primary Examiner

J. D. FREW, Assistant Examiner

U.S. Cl. X.R.

307—247, 291, 292